US012214784B2

(12) United States Patent
Komoguchi et al.

(10) Patent No.: US 12,214,784 B2
(45) Date of Patent: Feb. 4, 2025

(54) DRIVING ASSISTANCE CONTROL APPARATUS, DRIVING ASSISTANCE SYSTEM, AND DRIVING ASSISTANCE CONTROL METHOD FOR VEHICLE

(71) Applicant: DENSO CORPORATION, Kariya (JP)

(72) Inventors: Yuta Komoguchi, Kariya (JP); Yohei Masui, Kariya (JP); Kenji Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 574 days.

(21) Appl. No.: 17/110,337

(22) Filed: Dec. 3, 2020

(65) Prior Publication Data

US 2021/0086768 A1 Mar. 25, 2021

Related U.S. Application Data

(63) Continuation of application No. PCT/JP2019/021346, filed on May 29, 2019.

(30) Foreign Application Priority Data

Jun. 5, 2018 (JP) .................................. 2018-107540

(51) Int. Cl.
B60W 30/12 (2020.01)
B60W 30/165 (2020.01)
B60W 30/18 (2012.01)
B60W 40/06 (2012.01)

(52) U.S. Cl.
CPC .......... *B60W 30/12* (2013.01); *B60W 30/165* (2013.01); *B60W 30/18154* (2013.01); *B60W 40/06* (2013.01); *B60W 2552/53* (2020.02); *B60W 2554/4046* (2020.02); *B60W 2554/802* (2020.02)

(58) Field of Classification Search
None
See application file for complete search history.

(56) References Cited

U.S. PATENT DOCUMENTS

| 2009/0216405 | A1* | 8/2009 | Kudo | B62D 15/025 701/41 |
| 2009/0271084 | A1 | 10/2009 | Taguchi | |
| 2010/0100284 | A1* | 4/2010 | Kudo | B62D 15/025 701/42 |
| 2010/0188200 | A1 | 7/2010 | Hashimoto et al. | |
| 2014/0200801 | A1* | 7/2014 | Tsuruta | B60W 60/001 701/400 |

(Continued)

FOREIGN PATENT DOCUMENTS

| JP | 2003-182474 A | 7/2003 |
| JP | 2004-199286 A | 7/2004 |

(Continued)

*Primary Examiner* — David P. Merlino
(74) *Attorney, Agent, or Firm* — Maschoff Brennan

(57) ABSTRACT

A driving assistance control apparatus for a vehicle includes an acquiring unit and a control unit. The acquiring unit acquires a detected traveling environment of the vehicle. Using the acquired traveling environment, and in response to a preceding vehicle being present near a road edge and no obstacle being present between the road edge and the preceding vehicle, the control unit causes a driving assisting unit to perform driving assistance in which the preceding vehicle is tracked.

12 Claims, 9 Drawing Sheets

(56) References Cited

U.S. PATENT DOCUMENTS

| | | | | |
|---|---|---|---|---|
| 2016/0272203 | A1* | 9/2016 | Otake | B60W 30/18145 |
| 2018/0281793 | A1* | 10/2018 | Terayama | B60W 30/0956 |
| 2019/0241182 | A1* | 8/2019 | Sato | B60R 21/00 |
| 2020/0070826 | A1* | 3/2020 | Watanabe | G08G 1/167 |
| 2020/0108827 | A1* | 4/2020 | Kanoh | B60W 30/12 |
| 2020/0231151 | A1* | 7/2020 | Aoki | B62D 15/0255 |
| 2020/0238980 | A1* | 7/2020 | Goto | B60W 30/18163 |
| 2020/0331491 | A1* | 10/2020 | Wray | B60W 60/0011 |
| 2023/0211824 | A1* | 7/2023 | Sakaguchi | B60W 30/12 |
| | | | | 701/41 |

FOREIGN PATENT DOCUMENTS

| | | |
|---|---|---|
| JP | 2006-113918 A | 4/2006 |
| JP | 2010-237792 A | 10/2010 |
| JP | 2011-121548 A | 6/2011 |
| JP | 2012-022565 A | 2/2012 |
| JP | 2015-044432 A | 3/2015 |
| JP | 2016-031570 A | 3/2016 |
| WO | 2016067336 A1 | 6/2016 |

* cited by examiner

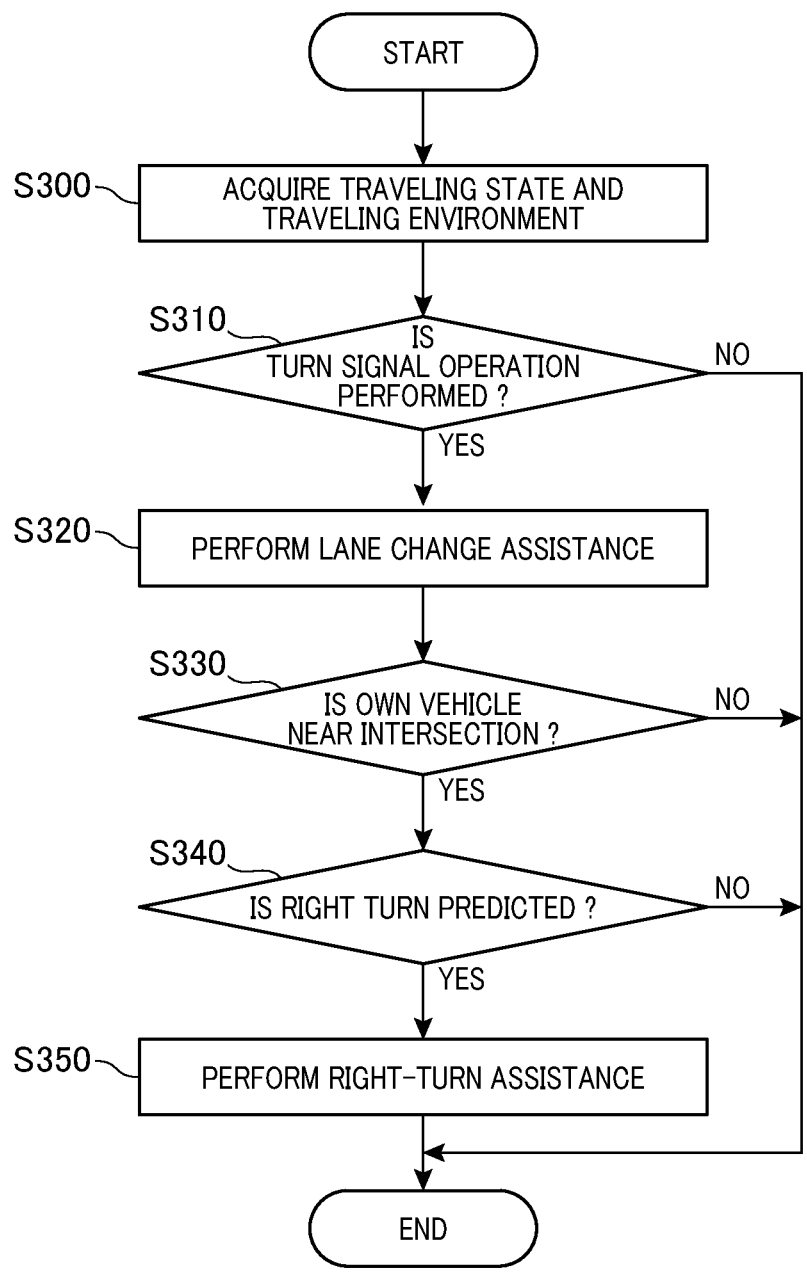

DRIVING ASSISTANCE CONTROL APPARATUS, DRIVING ASSISTANCE SYSTEM, AND DRIVING ASSISTANCE CONTROL METHOD FOR VEHICLE

CROSS-REFERENCE TO RELATED APPLICATIONS

The present application is a continuation application of International Application No. PCT/JP2019/021346, filed May 29, 2019, which claims priority to Japanese Patent Application No. 2018-107540, filed Jun. 5, 2018. The contents of these applications are incorporated herein by reference in their entirety.

BACKGROUND

Technical Field

The present disclosure relates to a driving assistance technology for assisting in driving of a vehicle.

Related Art

As a driving assistance technology for a vehicle, a lane keeping assistance technology in which a traveling trajectory is controlled so that an own vehicle does not deviate from a lane boundary line or a roadway outer line, or the own vehicle is positioned in a lane center has been proposed.

SUMMARY

One aspect of the present disclosure provides a driving assistance control apparatus for a vehicle. The driving assistance control apparatus acquires a detected traveling environment of the vehicle. Using the acquired traveling environment, and in response to a preceding vehicle being present near a road edge and no obstacle being present near an own vehicle on a side of the road edge, the driving assistance control apparatus causes driving assisting unit to perform driving assistance in which the preceding vehicle is tracked.

BRIEF DESCRIPTION OF THE DRAWINGS

In the accompanying drawings:

FIG. 9 is a flowchart of a processing flow of a driving assistance process performed by a driving assistance control apparatus according to the other embodiment.

DESCRIPTION OF THE EMBODIMENTS

Figure 1:
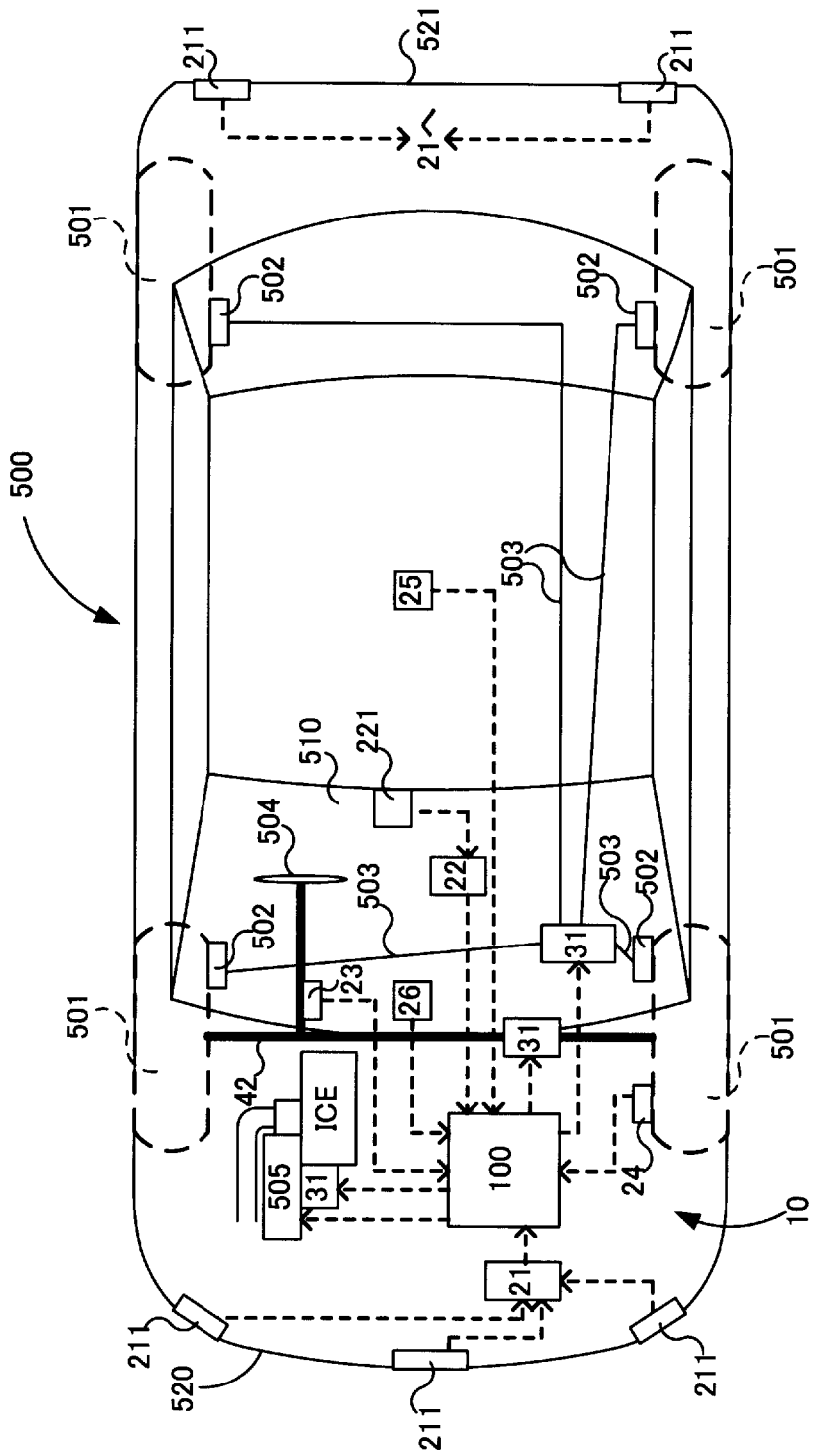
FIG. 1 is an explanatory diagram of an example of a vehicle in which a driving assistance control apparatus according to a first embodiment is mounted.

As a driving assistance technology for a vehicle, a lane keeping assistance technology in which a traveling trajectory is controlled so that an own vehicle does not deviate from a lane boundary line or a roadway outer line, or the own vehicle is positioned in a lane center has been proposed (for example, JP-A-2010-176194 and JP-A-2004-199286).

However, in the lane keeping assistance technology, a traveling state of the own vehicle is controlled so that that the own vehicle does not straddle the lane boundary line or the roadway outer line. Alternatively, execution of lane keeping assistance is canceled in conditions in which the lane boundary line or the roadway outer line is straddled. During execution of driving assistance in which the lane boundary line or the roadway outer line is not straddled, even under a condition in which the own vehicle is able to avoid a preceding vehicle and continue traveling by straddling the lane boundary line or the roadway outer line, the own vehicle is stopped or lane keeping assistance is canceled.

In addition, even in a case in which a preceding vehicle that is a tracking target is stopped such that the preceding vehicle is straddling a lane boundary line or a roadway outer line to ensure smooth traveling of other vehicles, a stopping position of the own vehicle may be near the lane center and obstruct smooth traveling of a following vehicle.

It is thus desired to perform driving assistance based on a traveling trajectory that does not obstruct smooth traveling of other vehicles.

A first exemplary embodiment provides a driving assistance control apparatus for a vehicle. This driving assistance control apparatus includes: an acquiring unit that acquires a detected traveling environment of the vehicle; and a control unit that, using the acquired traveling environment, and in response to a preceding vehicle being present near a road edge and no obstacle being present near an own vehicle on a side of the road edge, causes driving assisting unit to perform driving assistance in which the preceding vehicle is tracked.

As a result of the driving assistance control apparatus according to the first exemplary embodiment, driving assistance based on a traveling trajectory that does not obstruct smooth traveling of other vehicles can be performed.

A second exemplary embodiment provides a driving assistance control method for a vehicle. This driving assistance control method includes steps of: acquiring a traveling environment of the vehicle; and, using the acquired traveling environment, and in response to a preceding vehicle being present near a road edge and no obstacle being present near an own vehicle on a side of the road edge, causing a driving assisting unit to perform driving assistance in which the preceding vehicle is tracked.

As a result of driving assistance control method according to the second exemplary embodiment, driving assistance based on a traveling trajectory that does not obstruct smooth traveling of other vehicles can be performed. Here, the present exemplary embodiment can also be implemented as a platooning control program or a computer-readable recording medium in which the program is recorded.

A third exemplary embodiment provides a driving assistance control apparatus for a vehicle. This driving assistance control apparatus includes: an acquiring unit that acquires a detected traveling environment of the vehicle; and a control unit that, in response to the own vehicle being positioned near an intersection, causes a driving assisting unit to perform driving assistance in which the own vehicle travels or stops near a road edge or a center line, using the traveling environment.

As a result of the driving assistance control apparatus according to the third exemplary embodiment, driving assistance based on a traveling trajectory that does not obstruct smooth traveling of other vehicles can be performed.

A fourth exemplary embodiment provides a driving assistance control apparatus for a vehicle. This driving assistance control apparatus includes: an acquiring unit that acquires a detected traveling environment of the vehicle; and a control unit that, using the acquired traveling environment, and in response to a preceding vehicle being straddling a roadway outer line and the preceding vehicle being identified as a target for tracking, suppresses at least lane deviation prevention assistance in which the roadway outer line is a control target and causes a driving assisting unit to perform driving assistance in which the preceding vehicle is tracked.

As a result of the driving assistance control apparatus according to the fourth exemplary embodiment, driving assistance based on a traveling trajectory that does not obstruct smooth traveling of other vehicles can be performed.

A driving assistance control apparatus, a driving assistance system, and a driving assistance control method for a vehicle of the present disclosure will hereinafter be described according a several embodiments.

First Embodiment

As shown in FIG. 1, a driving assistance control apparatus 100 for a vehicle according to a first embodiment is used so as to be mounted in a vehicle 500.

The driving assistance control apparatus 100 is merely required to include at least a control unit and an acquiring unit. A driving assistance system 10 includes, in addition to the driving assistance control apparatus 100, a radar electronic control unit (ECU) 21, a camera ECU 22, a rotation angle sensor 23, a wheel speed sensor 24, a yaw rate sensor 25, a positioning sensor 26, and a driving assistance apparatus 31. The vehicle 500 includes wheels 501, a braking apparatus 502, a brake line 503, a steering wheel 504, an output control apparatus 505, a front windshield 510, a front bumper 520, and a rear bumper 521.

The radar ECU 21 is connected to a millimeter-wave radar 211 that emits radio waves and detects reflected waves from a target. The radar ECU 21 generates a detection signal that indicates the target by a reflection point using the reflected wave acquired by the millimeter-wave radar 211 and outputs the detection signal.

The camera ECU 22 is connected to a single-lens camera 221. The camera ECU 22 generates a detection signal that indicates a target by an image using an image captured by the camera 221 and a shape pattern of a target prepared in advance, and outputs the detection signal. Each of the ECUs 21 and 22 is a microprocessor that includes a calculating unit, a storage unit, and an input/output unit.

As a detector that detects the reflected waves, in addition to the millimeter-wave radar 211, a laser radar (LIDAR) or an ultrasonic wave detector that emits soundwaves and detects reflected waves thereof may be used. As an imaging apparatus that captures an image of a target, in addition to the single-lens camera 221, a stereo camera or a multi-camera that is configured by two or more cameras may be used. Furthermore, a rear camera or a side camera may be provided.

The brake apparatus 502 is provided in each wheel 501. For example, each brake apparatus 502 is a disk brake or a drum brake. The brake apparatus 502 implements braking of the vehicle 500 by braking the wheel 501 by braking force that is based on brake fluid pressure that is supplied through the brake line 503 based on a brake pedal operation by a driver. The brake line 503 includes a brake piston that generates the brake fluid pressure based on the brake pedal operation and a brake fluid line. Here, a configuration in which, instead of the brake fluid line, a control signal line is used as the brake line 503 and an actuator that is provided in each brake apparatus 502 is operated may be used The steering wheel 504 is connected to the wheel 501 on a front side with a steering apparatus 42 therebetween. The steering apparatus 42 includes a steering rod, a steering mechanism, and a steering shaft. A steering force auxiliary apparatus for reducing steering force may be provided in the steering apparatus 42.

The output control apparatus 505 includes a fuel injection apparatus that adjusts a throttle valve and an amount of supplied fuel amount on an accelerator pedal operation by the driver. The throttle valve adjusts an amount of intake air into an internal combustion engine ICE. Instead of the internal combustion engine ICE, an electric motor may be used. In this case, an output control apparatus that includes an inverter and a converter can be used.

The driving assistance apparatus 31 is a driving assisting unit. The driving assistance apparatus 31 is provided on the brake line 503 and includes a brake assistance apparatus, a steering assistance apparatus, and a drive assistance apparatus.

The brake assistance apparatus is capable of performing hydraulic pressure control that is independent of the brake pedal operation, by an actuator such as an electric motor. The steering assistance apparatus is capable of driving the steering apparatus 42 by an actuator such as an electric motor. The drive assistance apparatus is capable of controlling the output control apparatus 505. The driving assistance apparatus 31 implements brake assistance, steering assistance, and drive assistance based on detection results of the millimeter-wave radar 211 and the camera 221.

Figure 2:
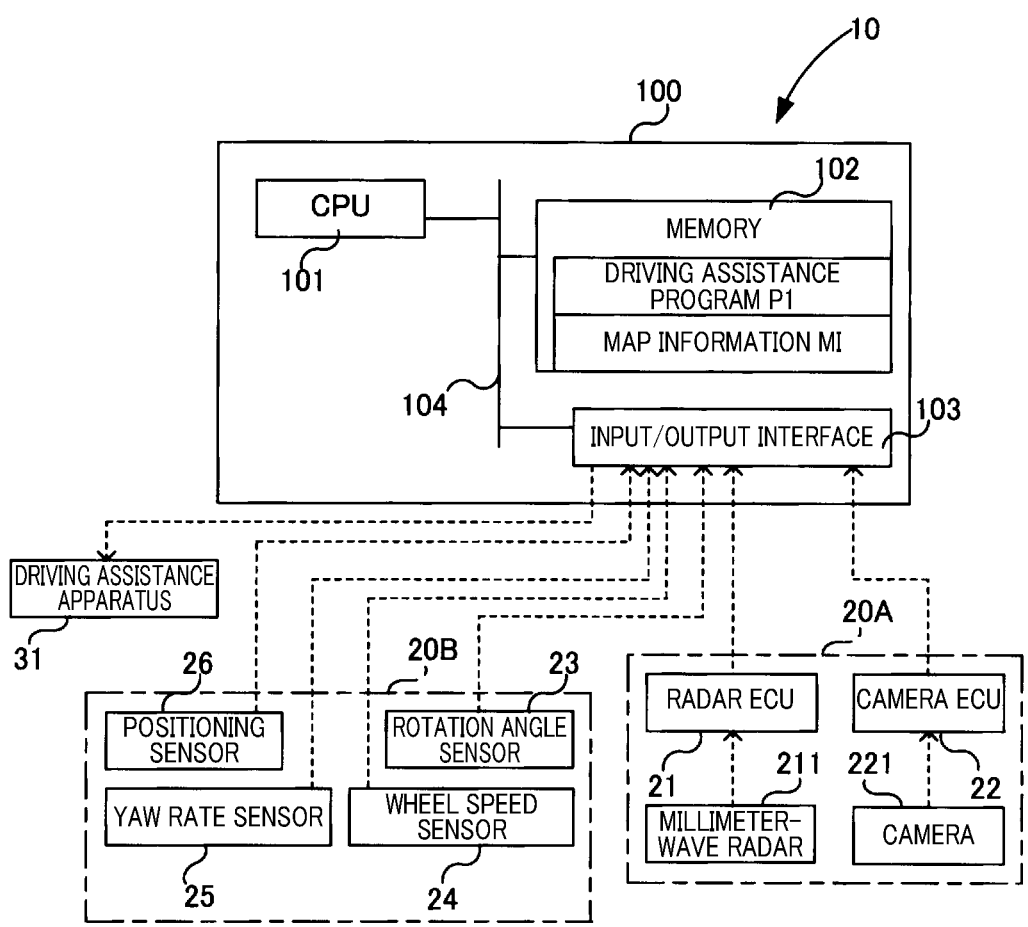
FIG. 2 is a block diagram of a functional configuration of the driving assistance control apparatus according to the first embodiment.

As shown in FIG. 2, the driving assistance control apparatus 100 includes a central processing unit (CPU) 101, a memory 102, an input/output interface 103, and a bus 104. The CPU 101 serves as a control unit. The input/output interface 103 serves as an acquiring unit. The CPU 101, the memory 102, and the input/output interface 103 are connected by the bus 104 so as to be capable of two-way communication.

The memory 102 includes a memory, such as a read-only memory (ROM), that stores therein a driving assistance program P1 in a non-volatile and read-only manner, and a memory, such as a random access memory (RAM), that is readable and writable by the CPU 101. The driving assistance program P1 is for performing driving assistance. The memory 102 also stores therein map information M1 that can be used in a navigation system.

The CPU 101 opens and runs the driving assistance program P1 that is stored in the memory 102 in a readable and writable memory. The CPU 101 thereby implements functions as the control unit that performs a driving assistance process to track a preceding vehicle that is near a road edge or a driving assistance process to cause the own vehicle to travel or stop near a road edge when the own vehicle is positioned near an intersection. Here, the CPU 101 may be a single CPU. Alternatively, the CPU 101 may be a plurality of CPUs that run each program. Alternatively, the CPU 101 may be a multi-core-type CPU that is capable of simultaneously running a plurality of programs.

The radar ECU 21, the camera ECU 22, the rotation angle sensor 23, the wheel speed sensor 24, the yaw rate sensor 25, and the positioning sensor 26, as well as the driving assistance apparatus 31, are each connected to the input/output interface 103 by a control signal line. Detection signals are inputted from the radar ECU 21, the camera ECU 22, the rotation angle sensor 23, the wheel speed sensor 24, the yaw rate sensor 25, and the positioning sensor 26.

Control signals that specify an operation state of a vehicle, such as a brake level, a steering angle, and required torque, are outputted to the driving assistance apparatus 31. Therefore, the input/output interface 103 functions as the acquiring unit for acquiring a traveling state of the own vehicle and a traveling environment surrounding the own vehicle detected by various sensors. Here, the radar ECU 21 and the millimeter-wave radar 211, and the camera ECU 22 and the camera 221 function as a traveling environment detection apparatus 20A.

The traveling environment refers to states and conditions surrounding the own vehicle, that is, an external world. For example, the traveling environment includes information such as position, speed, shape, and state of a target that is ahead of, behind, to the left of, or to the right of the own vehicle. For example, the target may include other vehicles, roads, road markings or road signs.

The rotation angle sensor 23, the wheel speed sensor 24, the yaw rate sensor 25, and the positioning sensor 26 function as a traveling state detection apparatus 20B. The traveling state refers to an interior of the own vehicle, that is, an internal world. For example, the traveling state includes speed, orientation, and rotational angular velocity of the vehicle 500.

The millimeter-wave radar 211 is a sensor that detects a distance, a relative speed, and an angle of a target by emitting millimeter waves and receiving reflected waves reflected by the target. According to the present embodiment, the millimeter-wave radar 211 is arranged in a center and on both side surfaces of the front bumper 520, and on both side surfaces of the rear bumper 521. An unprocessed detection signal that is outputted from the millimeter-wave radar 21 is processed by the radar ECU 21 and inputted to the driving assistance control apparatus 100 as a detection signal that is composed of a point or a series of points that indicates a single or a plurality of representative positions of the target.

Alternatively, the radar ECU 21 may not be provided, and a signal that indicates an unprocessed reception wave may be inputted as a detection signal from the millimeter-wave radar 211 to the driving assistance control apparatus 100. In cases in which the unprocessed reception wave is used as the detection signal, the driving assistance control apparatus 100 performs signal processing to identify the position and the distance of the target.

The camera 221 is an imaging apparatus that includes a single image sensor, such as a charge-coupled device (CCD). The camera 221 is a sensor that outputs, as image data that is a detection result and configured by monochrome or color pixel data, outer appearance information on a target by receiving visible light. According to the present embodiment, the camera 221 is arranged in a center of an upper portion of the front windshield 510. The camera ECU 22 performs a feature point extraction process on the image data that is outputted from the camera 221.

A pattern that is indicated by the extracted feature points and a comparison pattern prepared in advance that indicates an outer shape of a target to be identified, that is, a vehicle, are compared. When the extracted pattern and the comparison pattern match or are similar, a frame image that includes the identified target is generated. Meanwhile, when the extracted pattern and the comparison pattern do not match or are not similar, that is, when the extracted pattern and the comparison pattern are dissimilar, a frame image is not generated.

In the camera ECU 22, when the image data includes a plurality of targets, a plurality of frame images that include the identified targets is generated and inputted to the driving assistance control apparatus 100 as the detection signal. Each frame image is expressed by pixel data and includes position information, that is, coordinate information of the identified target. The number of frame images that can be included in the detection signal depends on a bandwidth between the camera ECU 22 and the driving assistance control apparatus 100. Unprocessed image data captured by the camera 221 may be inputted to the driving assistance control apparatus 100 as the detection signal without the camera ECU 22 being separately provided.

In this case, the driving assistance control apparatus 100 may perform identification of the target using the outer-shape pattern of the target to be identified. Here, when a target other than a vehicle, such as a traffic light or a road marking such as a lane marking or a stop line, is desired as the target to be identified, the outer-shape pattern of the desired target may be prepared and the camera ECU 22 may output a frame image that includes the desired target as the detection signal. In this case, in a process at a later stage of the driving assistance control apparatus 100, a suitable frame image may be selectively used for the process. This similarly applies to when a rear camera is provided.

The rotation angle sensor 23 is a torque sensor that detects an amount of torsion, that is, a steering torque that is generated in the steering rod as a result of steering of the steering wheel 504 and outputs a voltage value as the detection signal. The rotation angle sensor 23 detects the steering angle of the steering wheel 504. According to the present embodiment, the rotation angle sensor 23 is provided in the steering rod that connects the steering wheel 504 and the steering mechanism.

The wheel speed sensor 24 is a sensor that detects a rotation speed of the wheel 501. The wheel speed sensor 24 is provided in each wheel 501. The detection signal that is outputted from the wheel speed sensor 24 is a voltage value that is proportional to the wheel speed or a pulse wave that indicates an interval that is based on the wheel speed. Information such as vehicle speed and traveling distance of a vehicle can be acquired through use of the detection signal from the wheel speed sensor 24.

The yaw rate sensor 25 is a sensor that detects the rotational angular velocity of the vehicle 500. For example, the yaw rate sensor 25 is arranged in a center portion of the vehicle. The detection signal that is outputted from the yaw rate sensor 25 is a voltage value that is proportional to a rotation direction and angular velocity. A voltage value that indicates lane change or a left or right turn of the vehicle 500 can be detected.

The positioning sensor 26 is a sensor, such as a global navigation satellite system (GNSS) receiver or a moving body communication transceiver, for determining a position of the own vehicle by receiving a signal from a satellite or a base station. The position of the own vehicle serves as current position information of the own vehicle.

Figure 3:
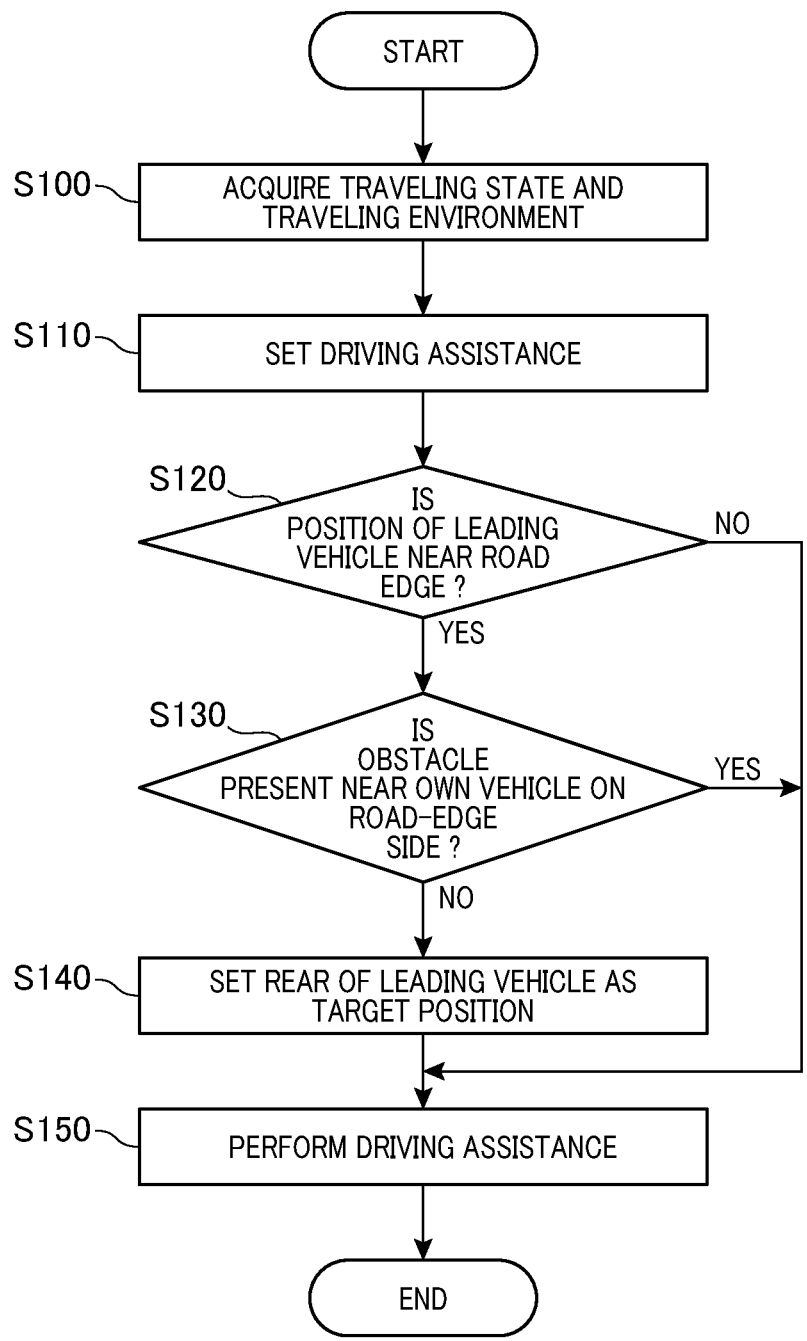
FIG. 3 is a flowchart of a processing flow of a driving assistance process performed by the driving assistance control apparatus according to the first embodiment.

A driving assistance process that is performed by the driving assistance control apparatus 100 according to the first embodiment will be described. For example, a processing routine shown in FIG. 3 is repeatedly performed at a predetermined time interval from start to stop of a control system of the vehicle or from when a start switch is turned on until the start switch is turned off. According to the present embodiment, a tracking assistance process is performed even when a preceding vehicle is positioned near a road edge.

The CPU 101 acquires details of the traveling environment from the traveling environment detection apparatus 20A and the traveling state from the traveling state detection apparatus 20B through the input/output interface 103 that serves as the acquiring unit (step S100). The CPU 101 sets driving assistance to be performed using the acquired traveling environment and the traveling state (step S110). For example, aspects of driving assistance that are set according to the present embodiment include a brake assistance process, a steering assistance process, and a drive assistance process.

The brake assistance process may perform sudden braking for emergency braking to avoid a collision with a target vehicle or gradual braking for maintaining inter-vehicle distance. The steering assistance process includes tracking steering for tracking a target vehicle and steering for lane keeping assistance that is referred to as lane keeping assist (LKA) or lane keeping control. Drive assistance process includes adaptive cruise control (ACC) for performing tracking travel such that a fixed inter-vehicle gap is maintained based on a speed of the target vehicle, speed control for maintaining a preset speed, and output torque control.

As an example of a setting for driving assistance, when a preceding vehicle is present, and ACC and LKA are in operation, command values for driving assistance in which the speed of the own vehicle is controlled so that the inter-vehicle distance between the target vehicle and the own vehicle is maintained at a predetermined fixed distance, and the steering angle of the own vehicle is controlled so that a traffic lane is maintained are set using the traveling environment and the traveling state.

More specifically, a required torque command value and a steering angle command value for the driving assistance apparatus 31 are set. In addition, when a likelihood of contact or collision with a preceding vehicle, an opposing vehicle, or a person is present, a command value for braking assistance to reduce the speed of the own vehicle or stop the own vehicle is set.

Here, lane keeping assistance may be canceled when the CPU 101 is unable to recognize a traffic lane, such as a roadway outer line, a lane boundary line, or a center line, that serves as a road marking on the road. Alternatively, lane keeping assistance may be performed so that a distance from the road edge to a side portion of the own vehicle is separated by a predetermined maintenance distance, such as a distance that allows a person or a bicycle to pass.

Figure 4:
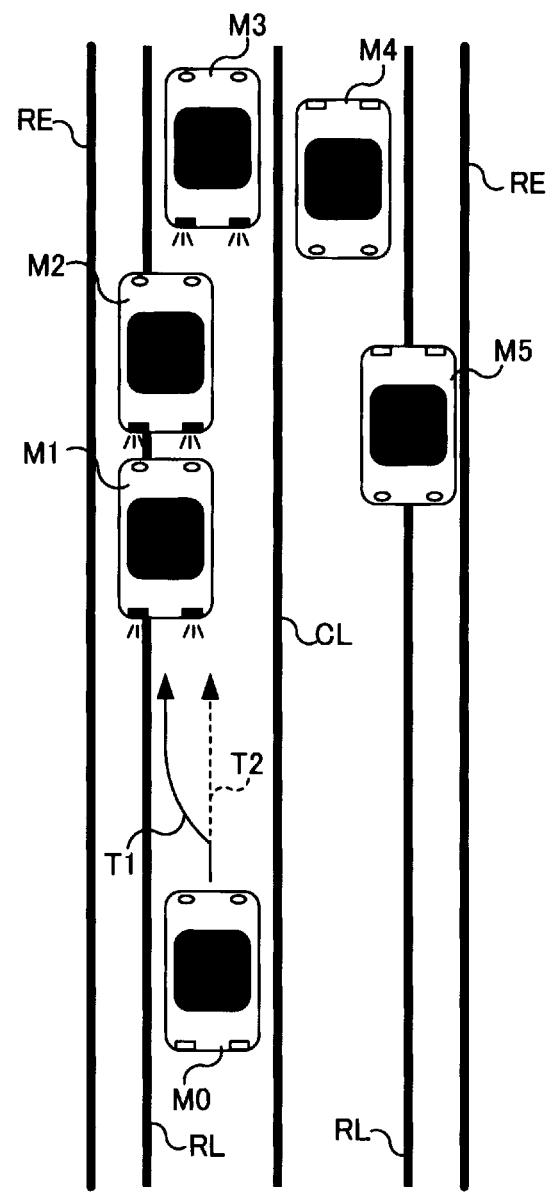
FIG. 4 is an explanatory diagram of a relationship among an own vehicle, a preceding vehicle, and an opposing vehicle according to the first embodiment.
Figure 5:
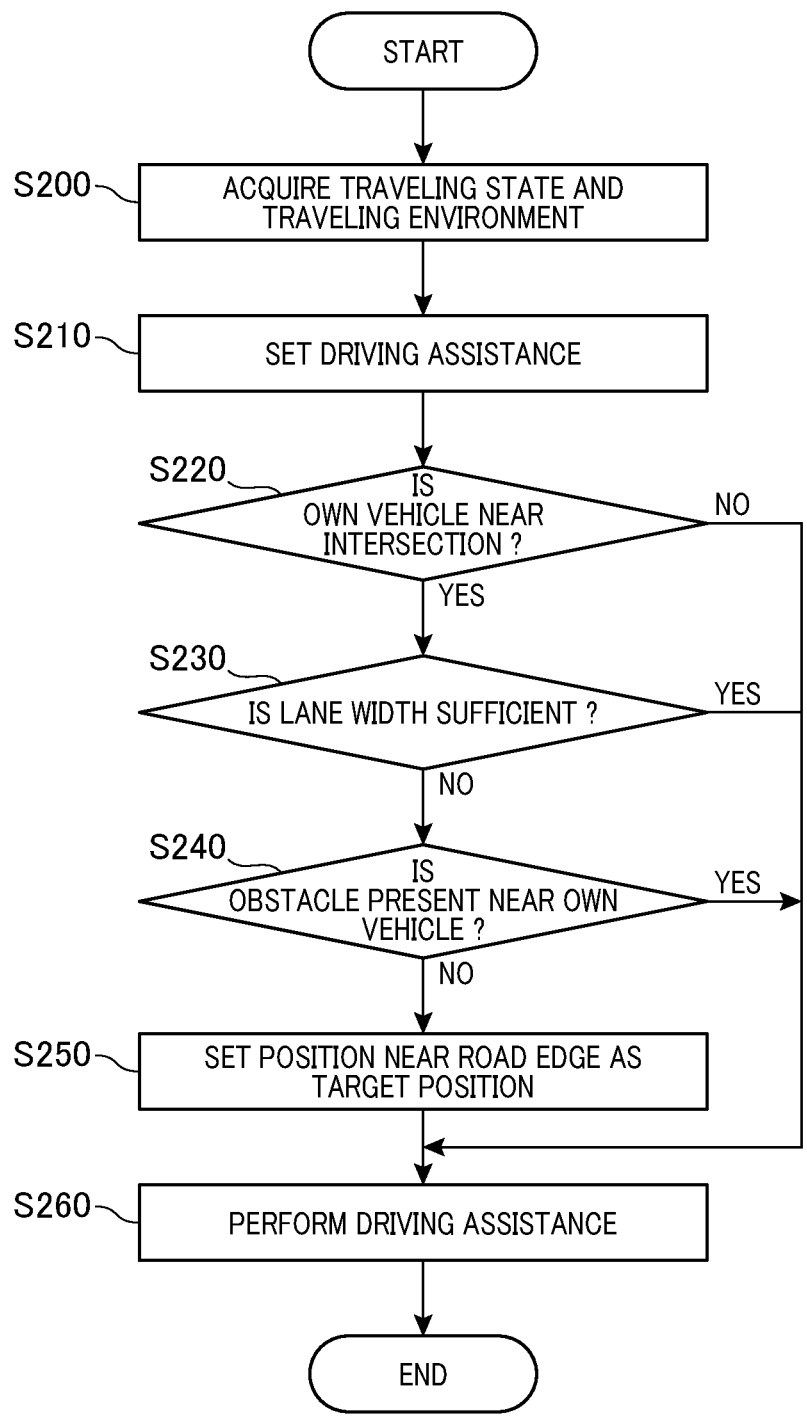
FIG. 5 is a flowchart of a processing flow of a driving assistance process performed by a driving assistance control apparatus according to a second embodiment.

The CPU 101 determines whether there is a preceding vehicle that is present near a road edge using the acquired traveling environment (step S120). In an example in FIG. 4, a stopped opposing vehicle M5 that is stopped or parked in an opposing traffic lane that is separated by a center line CL from an own traffic lane in which an own vehicle M0 is present, and preceding vehicles M1 and M2 that are near a road edge RE with an inter-vehicle gap in a vehicle-width direction are present.

As a result of the preceding vehicles M1 and M2 being stopped near the road edge RE, a traveling opposing vehicle M4 that is traveling in the opposing traffic lane can pass the stopped opposing vehicle M5. Furthermore, the preceding vehicles M1 and M2 are stopped so as to straddle a roadway outer line RL. For example, when a distance in a lateral direction between the road edge RE and the preceding vehicle M1 indicated by the acquired traveling environment is equal to or less than a predetermined determination value, the CPU 101 determines that a preceding vehicle that is near the road edge is present.

Here, the lateral direction coincides with a width direction of the road or a width direction of the vehicle. In addition to or instead of the width between the road edge RE and the preceding vehicle M1, when the preceding vehicle M1 is detected to be straddling the roadway outer line RL, the CPU 101 may determine that a preceding vehicle that is near the road edge is present. When the positions in the lateral direction of the roadway outer line RL and the preceding vehicle M1 indicated by the acquired traveling environment overlap, the CPU 101 can determine that the preceding vehicle M1 is straddling the roadway outer line RL. The road edge RE is a physical edge portion or boundary of a roadway.

For example, the road edge RE can be prescribed by a curbstone or a guardrail. The roadway outer line RL is a type of lane marking that indicates the boundary of the roadway to be traveled by the vehicle on the road edge RE side, as guidance. The roadway outer line RL prescribes the traffic lane on the road edge RE side. The center line CL is a type of lane marking that indicates the boundary of the roadway to be traveled by the vehicle on the opposing lane side. The center line CL prescribes the traffic lane on the opposing lane side.

When it is determined that there is no preceding vehicle M1 that is present near the road edge RE (No at step S120), the CPU 101 transmits the command value for the driving assistance that is set to the driving assistance apparatus 31 and causes the driving assistance apparatus 31 to perform driving assistance (step S150). The CPU 101 then ends the present processing routine. That is, when the preceding vehicle M1 that is near the road edge RE is not present, the aspect of driving assistance set at step S110 is performed as is.

When it is determined that a preceding vehicle M1 is present near the road edge RE (Yes at step S120), the CPU 101 determines whether an obstacle is present near the own vehicle M0 on the side of the road edge RE in which the preceding vehicle M1 is present, using the detected traveling environment (step S130). When the own vehicle M0 is controlled to travel towards the side of the road edge RE in which the preceding vehicle M1 is present, presence/absence of an obstacle on the side of the road edge RE is determined so that a collision with the obstacle is avoided or suppressed.

Specifically, the CPU 101 determines whether an obstacle is present within an area that is prescribed in a lateral direction and a vertical direction of the own vehicle M0 on the side of the road edge RE. These obstacles include an obstacle that is positioned in front of the own vehicle M0 or is approaching the own vehicle M0 from the front on the side of the road edge RE in which the preceding vehicle M1 is present, an obstacle that is approaching the own vehicle M0 from behind, and an obstacle that is positioned to the side of the own vehicle M0.

According to the present embodiment, the obstacle includes a person, a two-wheeled vehicle, and other on-road obstacles. Pattern matching of a person or a two-wheeled vehicle may be performed. Alternatively, when the shape of the obstacle is not applicable in pattern matching, the presence/absence of an obstacle of some sort, that is, an on-road obstacle may be determined. Here, when whether the roadway outer line RL is straddled is determined, whether an obstacle is present between the road edge RE and the roadway outer line RL may be determined.

When it is determined that an obstacle is present near the own vehicle M0 on the side of the road edge RE (Yes at step S130), the CPU 101 transmits the command value for the driving assistance that is set to the driving assistance apparatus 31 and causes the driving assistance apparatus 31 to perform driving assistance (step S150). The CPU 101 then ends the present processing routine. A reason for this is that, when an obstacle is present between the road edge RE and the preceding vehicle M1, if the own vehicle M0 advances towards the road edge RE, the own vehicle M0 may come into contact or collide with the obstacle. Therefore, driving assistance in which the preceding vehicle M1 is tracked should not be performed.

When it is determined that an obstacle is not present near the own vehicle M0 on the side of the road edge RE (No at step S130), the CPU 101 sets the rear or a center position in a rear portion of the preceding vehicle M1 as a target position (step S140). The CPU 101 performs tracking driving assistance in which the preceding vehicle M1 is tracked. Specifically, when lane keeping assistance or lane deviation prevention assistance using the roadway outer line RL is performed, lane keeping assistance is canceled.

Alternatively, when the roadway outer line RL is not present and lane keeping assistance is performed so that the own vehicle M0 is separated from the road edge RE by a maintenance distance, the maintenance distance is set to be short or lane keeping assistance is canceled. As a result, the own vehicle M0 can travel based on a traveling trajectory in which the own vehicle M0 crosses the roadway outer line RL or approaches the road edge RE, steers to the rear of the preceding vehicle M1, advances near the road edge RE, and tracks the preceding vehicle M1.

In addition, driving assistance for tracking can be performed in which the own vehicle M0 straddles the roadway outer line RL to follow the preceding vehicle M1 that travels so as to straddle the roadway outer line RL. As the target position, latitude and longitude coordinates, that is, absolute coordinates or world coordinates can be used when satellite navigation can be used.

Alternatively, an amount of lateral shift between a width-direction center of the rear portion of the preceding vehicle M1 and a width-direction center of the front portion of the own vehicle M0 may be determined. An x-coordinate (width direction) and a y-coordinate (advancing direction) on a horizontal plane that is parallel to the road may be used so that the amount of lateral shift is zero and the inter-vehicle distance between the preceding vehicle M1 and the own vehicle M0 is a predetermined distance.

In this case, relative position coordinates of the preceding vehicle M1 relative to the own vehicle M0, that is, local coordinates are used. Here, the target position may be changed based on the distance between the preceding vehicle M1 and the own vehicle M0, and the shape of the road. In addition, the target position may be set such that a dead zone is applied relative to a behavior of the preceding vehicle M1, and tracking driving assistance may be performed.

The CPU 101 causes the driving assistance apparatus 31 to perform driving assistance using the target position that is set (step S150) and ends the present processing routine. The CPU 101 controls the vehicle speed and the steering angle using the traveling environment detection apparatus 20A, the traveling state detection apparatus 20B, and the driving assistance apparatus 31, so that the own vehicle M0 advances towards the target position, that is, takes a traveling trajectory that tracks the preceding vehicle M1. As parameters for controlling the driving assistance apparatus 31, vehicle speed v and rotational angular velocity w can be used.

When the latitude and longitude are set as the target position, that is, the target coordinates, the CPU 101 controls the driving assistance apparatus 31 so that the latitude and longitude coordinates of the own vehicle acquired through the positioning sensor 26 match the target position. In addition to steering assistance, when the preceding vehicle M1 is stopped, the CPU 101 stops the own vehicle M0 through the driving assistance apparatus 31 so that the distance to the preceding vehicle M1, that is, the inter-vehicle gap in the advancing direction is a predetermined distance.

Stopping of the own vehicle M0 may be performed as ACC control. Alternatively, ACC control may be cancelled and stopping of the own vehicle M0 may be performed as brake assistance. When the preceding vehicle M1 is traveling, the CPU 101 identifies the preceding vehicle M1 as the tracking target and causes the own vehicle M0 to track the preceding vehicle M1 through ACC control, in addition to steering assistance.

As a result of the driving assistance control apparatus 100 according to the first embodiment, described above, when the preceding vehicle M1 that is near the road edge RE is present and an obstacle is not present near the own vehicle M0 on the side of the road edge RE, the driving assistance apparatus 31 can be made to perform tracking driving assistance in which the preceding vehicle M1 is tracked.

More specifically, the own vehicle M0 can advance near the road edge RE by straddling the roadway outer line RL. Alternatively, the own vehicle M0 can advance near the road edge RE even when the roadway outer line RL is not present. As a result, driving assistance can be performed based on a traveling trajectory T1 that does not obstruct smooth traveling of other vehicles, particularly a following vehicle of the own vehicle M0 or the opposing vehicle M4 in the opposing lane.

In contrast, in lane keeping assistance in which the road edge RE is not approached or in conventional driving assistance in which lane keeping assistance is maintained using the roadway outer line RL and the lane boundary line or the center line CL, the own vehicle M0 cannot approach the road edge RE by straddling the traffic lane or approach the road edge RE regardless of the presence/absence of the traffic lane. The own vehicle M0 takes a traveling trajectory T2 that obstructs smooth traveling of other vehicles.

According to the first embodiment, when the preceding vehicle M1 that is a target of ACC control moves near the road edge RE, lane keeping assistance is canceled. In addition, when the preceding vehicle M1 travels so as to straddle the roadway outer line RL, ACC control in which the own vehicle M0 straddles the road outer line RL to match the preceding vehicle M1 is continued. ACC control can include driving assistance in which restarting of the own vehicle M0 in response to restarting of the preceding vehicle M1 is performed. Meanwhile, when the preceding vehicle M1 is already present near the road edge RE, that is, when the own vehicle M0 catches up with the preceding vehicle M1 that has been separated from the own vehicle M0, lane keeping assistance is canceled and ACC control in which the preceding vehicle M1 is the target is started.

Benefits of the driving assistance control apparatus 100 according to the first embodiment can be received when, for example, in a state in which lane keeping assistance and driving assistance accompanying ACC control is performed, merging from a motorway or an expressway to a general street occurs at an interchange through a straight-advancing road and a left/right-turn road.

Alternatively, the benefits of the driving assistance control apparatus 100 according to the first embodiment can be obtained on a road on which a channelizing strip (zebra zone) is present. That is, when lane keeping assistance in which entry into the channelizing strip is not permitted is performed, as a result of lane keeping assistance being cancelled and entry into the channelizing strip being permitted, road width can be effectively used and smooth traveling of a following vehicle of the own vehicle M0 can be implemented. As described above, the benefits of the driving assistance control apparatus 100 according to the first embodiment can also be received when a parked vehicle is present on an opposing-lane side of the own vehicle M0 on an opposing road of a general road.

Second Embodiment

According to a second embodiment, driving assistance that tracks the preceding vehicle M1 is performed with the own vehicle M0 being near an intersection as a condition rather than the presence of the preceding vehicle M1. Here, configurations of a driving assistance control apparatus and a driving assistance system according to the second embodiment is similar to those of the driving assistance control apparatus 100 and the driving assistance system 10 according to the first embodiment. Therefore, the same reference numbers are used. Descriptions are omitted.

Figure 6:
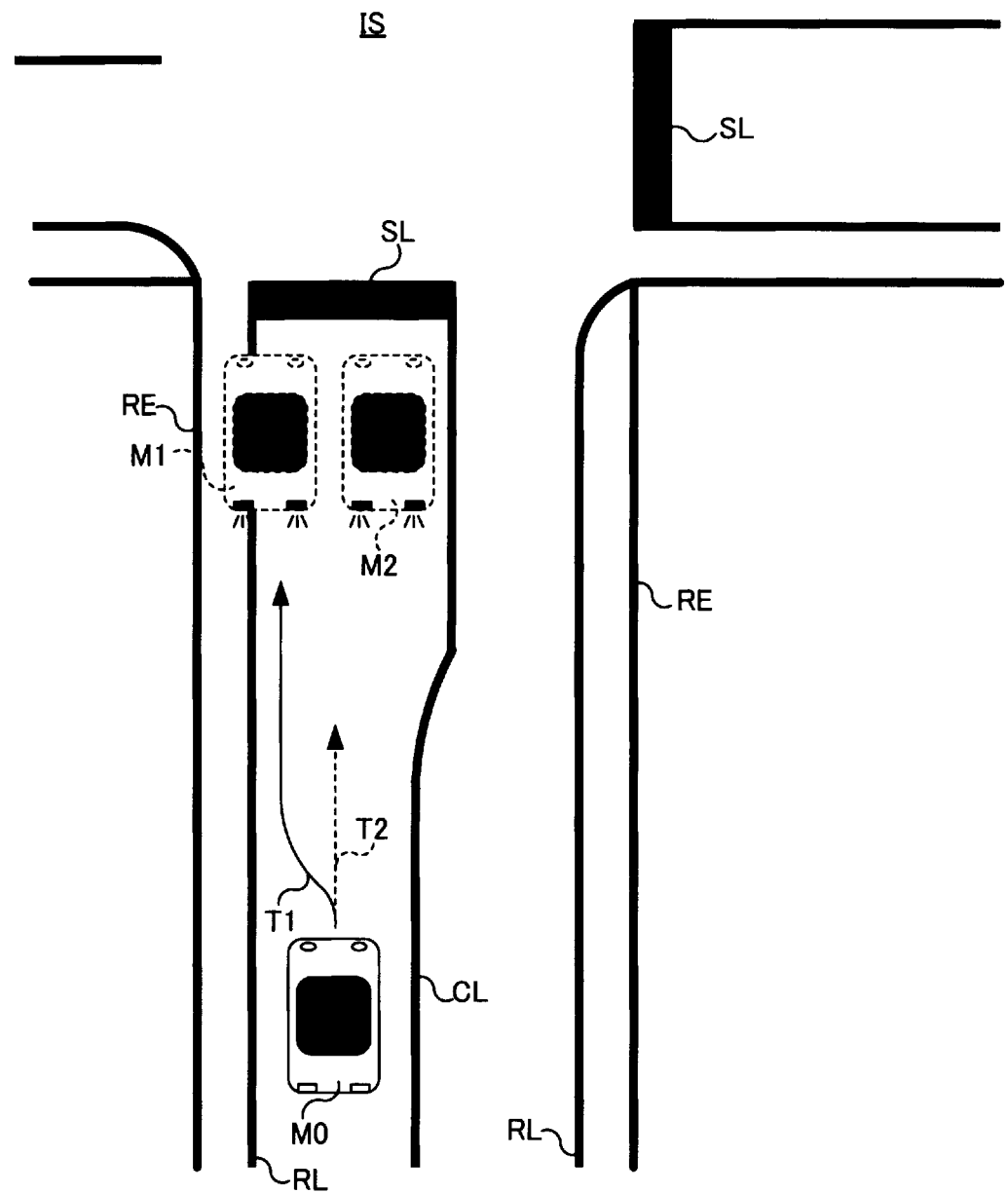
FIG. 6 is an explanatory diagram of a relationship between an own vehicle and a preceding vehicle according to the second embodiment.

The driving assistance process performed by the driving assistance control apparatus 100 according to the second embodiment will be described. For example, the processing routine shown in FIG. 6 is repeatedly performed at a predetermined time interval from start to stop of a control system of the vehicle or from when a start switch is turned on until the start switch is turned off. According to the present embodiment, a driving assistance process to position the own vehicle near a road edge is performed when the own vehicle is present near an intersection.

The CPU 101 acquires the traveling environment from the traveling environment detection apparatus 20A and the traveling state from the traveling state detection apparatus 20B through the input/output interface 103 that serves as the acquiring unit (step S200). The CPu 101 sets driving assistance that is performed using the acquired traveling environment and traveling state (step S210). An aspect of the driving assistance that is set according to the present embodiment is as described according to the first embodiment.

The CPU 101 determines whether an intersection is present near the own vehicle, that is, the current position of the own vehicle is near an intersection using the acquired traveling environment (step S220). In an example in FIG. 6, the own vehicle M0 is advancing towards an intersection IS. In addition, a straight-advancing vehicle M1 and a right-turning vehicle M2 are present at a stop line SL before the intersection IS. The preceding vehicle M1 is stopped near the road edge RE. The right-turning vehicle M2 can advance to the stop line SL and stop. Furthermore, the preceding vehicles M1 and M2 are stopped so as to straddle the roadway outer line RL.

Here, according to the second embodiment, the presence of the preceding vehicles M1 and M2 is not a condition but is shown in the drawing to facilitate description. For example, the CPU 101 can determine whether the current position of the own vehicle M0 is near the intersection IS using the latitude and longitude information of the own vehicle M0 and the map information M1.

In addition, the CPU 101 may determine that the own vehicle M0 is positioned near the intersection IS by pattern matching using an image of an area ahead of the own vehicle M0 acquired by the traveling environment detection apparatus 20A and an intersection shape pattern that is intersection layout information. Furthermore, the CPU 101 may determine that the own vehicle M0 is positioned near the intersection IS using information acquired through road-vehicle communication.

When it is determined that the own vehicle M0 is not positioned near the intersection IS (No at step S220), the CPU 101 transmits the command value for the driving assistance that is set to the driving assistance apparatus 31 and causes the driving assistance apparatus 31 to perform driving assistance (step S260). The CPU 101 then ends the present processing routine. That is, when the current position of the own vehicle M0 is not positioned near the intersection IS, the aspect of the driving assistance set at step S210 is performed as is.

When it is determined that the own vehicle M0 is positioned near the intersection IS (Yes at step S220), the CPU 101 determines whether a lane width in the advancing direction of the own vehicle M0 is sufficient. The lane width refers to a distance between the roadway outer line RL and the center line (CL) or a distance between the road edge RE and the center line CL. In addition, the lane width that is sufficient refers to a lane width that is longer than the width of two vehicles and indicates that two vehicles can be stopped so as to be side by side.

When it is determined that the road ahead does not have a sufficient lane width (No at step S230), the CPU 101 proceeds to step S260. The CPU 101 transmits the command value for the driving assistance that is set to the driving assistance apparatus 31 and causes the driving assistance apparatus 31 to perform the driving assistance. The CPU 101 then ends the present processing routine. A reason for this is that, when the lane width of the road before the intersection IS is not sufficient, because two vehicles cannot be side by side in the lateral direction, even when the own vehicle M0 is advanced towards the road edge RE, the following vehicle cannot advance.

When it is determined that the road ahead has a sufficient lane width (Yes at step S230), the CPU 101 determines whether an obstacle is present near the own vehicle M0 on the side of the road edge RE using the detected traveling environment (step S240). Specifically, the CPU 101 determines whether an obstacle is present near the own vehicle M0 within a predetermined distance area from the road edge RE.

Alternatively, the CPU 101 may determine whether an obstacle is present near the own vehicle M0 within an area between the road edge RE and the roadway outer line RL. When the preceding vehicle M1 is present, and whether the preceding vehicle M1 is straddling the roadway outer line RL is determined, the CPU 101 may determine whether an obstacle is present near the own vehicle M0 within the area between the road edge RE and the roadway outer line RL.

When it is determined that an obstacle is present near the own vehicle M0 on the side of the road edge RE (Yes at step S240), the CPU 101 transmits the command value for the driving assistance that is set to the driving assistance apparatus 31 and causes the driving assistance apparatus 31 to perform the driving assistance (step S250). The CPU 101 then ends the present processing routine.

A reason for this is that, when the obstacle is present near the own vehicle M0 on the side of the road edge RE, if the own vehicle M0 advances towards the road edge RE, the own vehicle M0 may come into contact or collide with the obstacle in a lateral direction or a front/rear direction of the own vehicle M0 on the road edge RE side. Therefore, driving assistance in which the own vehicle M0 is moved near the road edge RE should not be performed.

When it is determined that an obstacle is not present near the own vehicle M0 on the side of the road edge RE (No at step S240), the CPU 101 sets a position near the road edge RE as a target position (step S250) and performs driving assistance to move the own vehicle M0 near the road edge RE. Specifically, when lane keeping assistance using the roadway outer line RL is performed, lane keeping assistance is canceled.

Alternatively, when the roadway outer line RL is not present and lane keeping assistance is performed so that the own vehicle M0 is separated from the road edge RE by a maintenance distance, the maintenance distance is set to be short or lane keeping assistance is canceled. As a result, the own vehicle M0 can cross the roadway outer line RL and travel near the road edge RE.

Alternatively, when the roadway outer line RL is not present, the own vehicle M0 can travel near the road edge RE. As the target position, latitude and longitude coordinates, that is, absolute coordinates or world coordinates to be the target when the own vehicle M0 is positioned near the road edge RE on the road on which the own vehicle M0 is advancing can be used when satellite navigation can be used.

Alternatively, an amount of lateral shift between a target point that indicates a position that is separated from the road edge RE by a predetermined distance to position the vehicle near the road edge RE and a width-direction center of the front portion of the own vehicle M0 may be determined.

An x-coordinate (width direction) and a y-coordinate (advancing direction) on a horizontal plane that is parallel to the road may be used so that the amount of lateral shift is zero and the inter-vehicle distance between the stop line SL and the own vehicle M0 is a predetermined distance. In this case, relative position coordinates of the target point relative to the own vehicle M0, that is, local coordinates, are used.

The CPU 101 causes the driving assistance apparatus 31 to perform driving assistance using the target position that is set (step S260) and ends the present processing routine. The CPU 101 controls the vehicle speed and the steering angle using the traveling environment detection apparatus 20A, the traveling state detection apparatus 20B, and the driving assistance apparatus 31, so that the own vehicle M0 advances towards the target position, that is, takes a traveling trajectory that approaches and runs along the road edge RE.

Specific processes are already described according to the first embodiment. Therefore, descriptions of identical processing content are omitted. In addition to steering assistance, when a traffic light ahead indicates red (stop), the CPU 101 stops the own vehicle M0 through the driving assistance apparatus 31 so that the own vehicle M0 stops at the stop line SL.

Stopping of the own vehicle M0 is performed as braking assistance. In addition to steering assistance, when the traffic light ahead indicates green (advancing permitted), the CPU 101 moves the own vehicle M0 near the road edge RE and causes the own vehicle M0 to travel along the road edge RE using cruise control (CC) in which traveling speed that is set in the own vehicle is maintained.

As a result of the driving assistance control apparatus 100 according to the second embodiment, described above, when the own vehicle M0 is positioned near an intersection and an obstacle is not present near the own vehicle M0 on the side of the road edge RE, the driving assistance apparatus 31 can be made to perform driving assistance in which the own vehicle M0 advances towards the road edge RE. As a result, driving assistance can be performed based on the traveling trajectory T1 that does not obstruct smooth traveling of other vehicles, particularly a following vehicle of the own vehicle M0. In contrast, in conventional driving assistance in which lane keeping assistance is being kept, the own vehicle M0 takes a traveling trajectory T2 that obstructs smooth traveling of other vehicles.

In the driving assistance apparatus 100 according to the second embodiment, described above, driving assistance in which the own vehicle M0 is advanced towards the road edge RE near an intersection is performed.

However, driving assistance in which the own vehicle M0 is advanced towards the center line CL near an intersection may also be performed. That is, a vehicle that is making a right turn at the intersection IS preferably travels near the center line CL near an intersection in which road width is narrow, so that the vehicle does not obstruct advancing of a straight-advancing following vehicle. In this case, the above-described driving assistance process is merely required to be performed with reference to the center line CL instead of the road edge RE.

In addition, instead of driving assistance in which the roadway outer line RL is straddled, driving assistance in which a channelizing strip (zebra zone) is entered (straddled) may be permitted. In driving assistance performed towards the center line CL, a determination as to whether an obstacle is present at the center line CL that corresponds to the determination as to whether an obstacle is present at the road edge RE (step S240) may be omitted. A reason for this is that a person or a bicycle is typically not present near the center line CL.

According to the second embodiment, described above, the determination as to whether the road ahead has a sufficient lane width (step S230) may be omitted. A reason for this is that, when the lane width of the road before the intersection IS is not sufficient, the following vehicle may not be able to advance even when the own vehicle M0 is advanced towards the road edge RE. However, as a result of the own vehicle M0 being advanced towards the road edge, for example, there is an advantage in that a frontward visibility of the following vehicle can be ensured.

Third Embodiment

Figure 7:
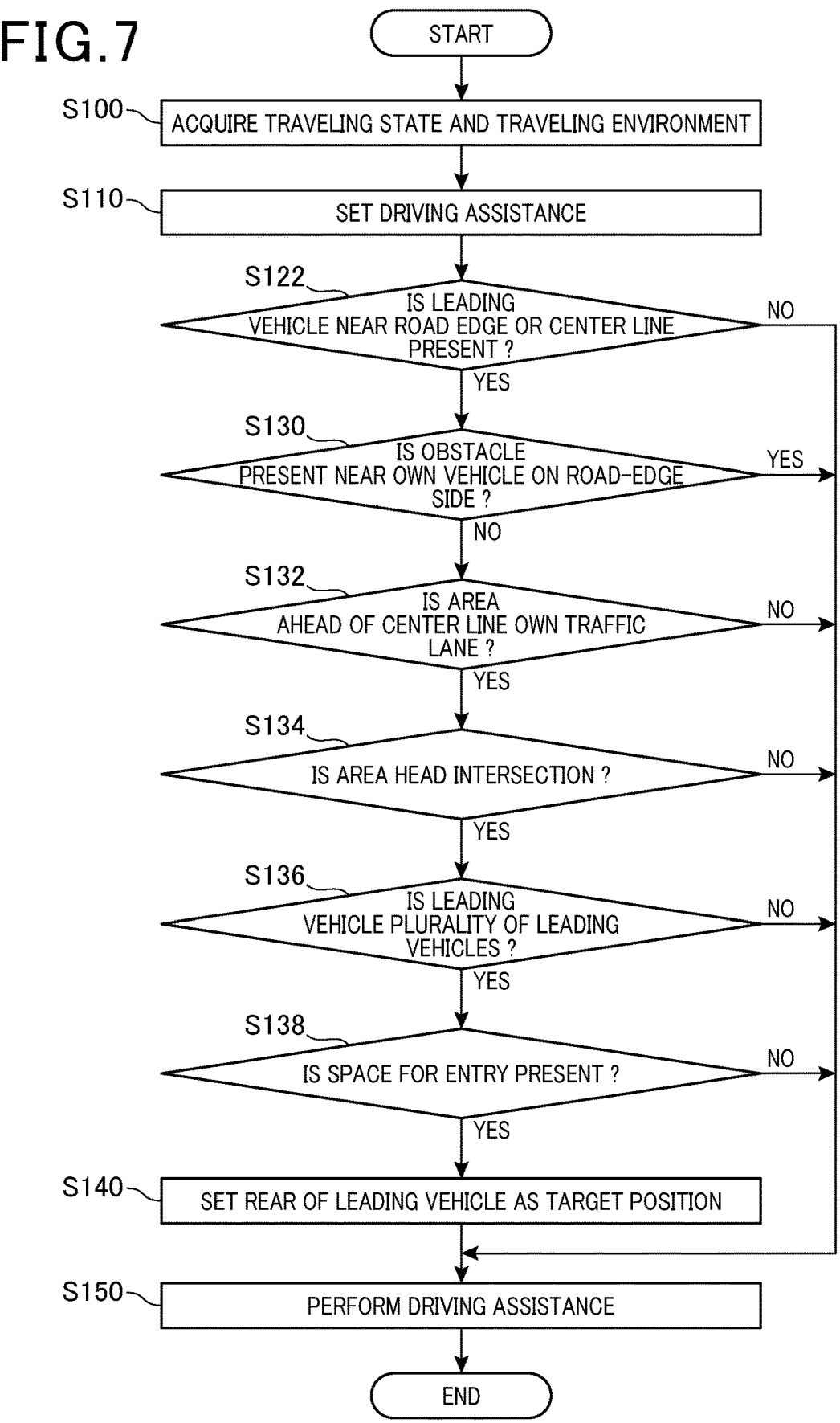
FIG. 7 is a flowchart of a processing flow of a driving assistance process performed by a driving assistance control apparatus according to a third embodiment.

The driving assistance process performed by the driving assistance control apparatus 100 according to the first embodiment can further be performed as a driving assistance process according to a third embodiment shown in FIG. 7. Here, the driving assistance process according to the third embodiment is the driving assistance process according to the first embodiment to which a determination condition as to whether to perform tracking driving assistance that targets a preceding vehicle is added.

In addition, processing steps similar to the processing steps according to the first embodiment are given the same reference numbers. Descriptions are omitted. For example, a processing routine shown in FIG. 7 is repeatedly performed at a predetermined time interval from start to stop of a control system of the vehicle or from when a start switch is turned on until the start switch is turned off. A positional relationship between the own vehicle and the preceding vehicle is described with reference to FIG. 4 and FIG. 6.

The CPU 101 performs steps S100 and S110, and determines whether the preceding vehicle M1 (FIG. 4 and FIG. 6) that is near the road edge RE or a preceding vehicle M3 (FIG. 6) that is near the center line CL is present using the acquired traveling environment (step S122).

A method for determining the preceding vehicle near the road edge RE is already described according to the first embodiment. For example, a method for determining the preceding vehicle near the center line CL is a preceding vehicle near the center line CL or straddling the center line CL being determined to be present when a distance in the lateral direction between the center line CL and the preceding vehicle M3 indicated by the acquired traveling environment is equal to or less than a predetermined determination value.

When it is determined that the preceding vehicle M1 that is near the road edge RE or the preceding vehicle M3 that is near the center line CL is not present (No at step S122), the CPU 101 proceeds to step S150. The CPU 101 performs the driving assistance process set at step S110 and ends the present processing routine. A reason for this is that, in this case, even when the own vehicle M0 is not advanced towards the road edge RE or the center line CL, the own vehicle M0 does not obstruct advancing of the following vehicle.

When it is determined that the preceding vehicle M1 that is near the road edge RE or the preceding vehicle M3 that is near the center line CL is present (Yes at step S122), the CPU 101 determines whether an obstacle is present between the road edge RE and the preceding vehicle M1 (step S130). When it is determined that an obstacle is present between the road edge RE and the preceding vehicle M1 (Yes at step S130), the CPU 101 proceeds to step S150. The CPU 101 performs the driving assistance process set at step S110 and ends the present processing routine.

When it is determined that an obstacle is not present between the road edge RE and the preceding vehicle M1 (No at step S130), the CPU 101 determines whether an area ahead of the center line CL is the own traffic lane (step S132). That is, whether an area ahead of the preceding vehicle M3 that is near the center line CL is the own traffic lane is determined.

For example, when the road width widens, the area ahead of the center line CL is the widened own traffic lane. In addition, a right-turn lane is present before an intersection. In this case, the area ahead of the center line CL before reaching the right-turn lane is the own traffic lane, that is, the right-turn lane. Meanwhile, when the road width becomes narrower or when a right-turn lane is not present, the area ahead of the center line CL may be an opposing lane, or when the center line CL is straddled, traveling or stopping may be performed so as to intrude into the opposing lane.

Whether the area ahead of the center line CL is the own traffic lane may be determined using an extended shape of the center line CL detected by the traveling environment detection apparatus 10A. Alternatively, whether the area ahead of the center line CL is the own traffic lane may be determined based on the shape of the road identified using the position information of the own vehicle and the map information M1.

When it is determined that the area ahead of the center line CL is not the own traffic lane (No at step S132), the CPU 101 proceeds to step S150. The CPU 101 performs the driving assistance process set at step S110 and ends the present processing routine. When it is determined that the area ahead of the center line CL is the own traffic lane (Yes at step S132), the CPU 101 determines whether the intersection IS is present ahead (step S134). A method for determining whether the own vehicle M0 is positioned near the intersection IS is already described according to the second embodiment.

When it is determined that the intersection IS is not present ahead (No at step S134), the CPU 101 proceeds to step S150. The CPU 101 performs the driving assistance process set at step S110 and ends the present processing routine. A reason for this is that, in this case, the following vehicle is a straight-advancing vehicle and does not advance into the right-turn lane. Even when the own vehicle M0 does not advance towards the road edge RE or the center line CL, smooth traveling of the following vehicle is not obstructed.

When it is determined that the intersection IS is present ahead (Yes at step S134), the CPU 101 determines whether the preceding vehicle is a plurality of preceding vehicles, that is, whether the preceding vehicle is more than a single preceding vehicle (step S136). Whether the preceding vehicle is a plurality of preceding vehicles can be determined using a number of preceding vehicles detected by the traveling environment detection apparatus 20A.

Specifically, whether the preceding vehicle is a plurality of preceding vehicles can be determined by the number of preceding vehicles detected as a result of pattern matching by the camera ECU 22 being counted. When it is determined that the preceding vehicle is not a plurality of preceding vehicles (No at step S136), the CPU 101 proceeds to step S150. The CPU 101 performs the driving assistance process set at step S110 and ends the present processing routine.

For example, when a plurality of traffic lanes including the right-turn lane is present and the preceding vehicles M1 and M2 are present in the traffic lanes, as a result of tracking driving assistance being performed for the preceding vehicle M1, obstruction of the advancing of the following vehicle that advances to the right-turn lane can be prevented or suppressed.

Alternatively, a reason for this is that, when a plurality of preceding vehicles is present in a line in a single traffic lane, the advancing position of the own vehicle M0 easily affects the advancing of the following vehicle, and the benefits of tracking driving assistance in which the preceding vehicle M1 is tracked can be further received. Meanwhile, when a plurality of preceding vehicles is not present, this means that the following vehicle cannot advance even if the own vehicle M0 advances towards the road edge RE. Benefits of performing tracking driving assistance in which the preceding vehicle M1 is tracked are few or none.

When it is determined that the preceding vehicle is a plurality of preceding vehicles (Yes at step S136), the CPU 101 determines whether a space into which the following vehicle can enter is present to the side of the preceding vehicle M1 (step S138). Specifically, the CPU 101 determines whether a distance between the preceding vehicle M1 and the lane boundary line or the center line CL is greater than a predetermined distance, such as the width of a single vehicle. When it is determined that a space enabling entry is not present (No at step S138), the CPU 101 proceeds to step S150.

The CPU 101 performs the driving assistance process set at step S110 and ends the present processing routine. A reason for this is that, when a space into which the following vehicle can enter is not present to the side of the preceding vehicle M1, because two vehicles cannot be side by side in the lateral direction, the following vehicle cannot advance even if the own vehicle M0 advances towards the road edge RE.

When it is determined that a space enabling entry is present (Yes at step S138), the CPU 101 sets the rear of the preceding vehicle M1 as the target position (step S140). The CPU 101 performs the driving assistance process (step S150) and ends the present processing routine. A specific method for setting the rear of the preceding vehicle M1 as the target position and the driving assistance process are already described according to the first embodiment.

As a result of the driving assistance control apparatus 100 according to the third embodiment, described above, in addition to the conditions according to the first embodiment, a condition for causing the driving assistance apparatus 31 to perform tracking driving assistance in which the preceding vehicle M1 is tracked is determined. As a result, driving assistance that does not obstruct smooth traveling of a following vehicle of the own vehicle M0 and the opposing vehicle M4 in the opposing lane can be performed under more suitable conditions.

According to the third embodiment, in addition to the above-described conditions, in cases in which the own vehicle position can be identified by the positioning sensor 26 and the map information M1, tracking driving assistance in which the preceding vehicle M1 is tracked can be performed when the traveling trajectory of the own vehicle can be predicted by a turn signal operation. In these cases, the traveling trajectory of the own vehicle M0 can be more accurately predicted. In addition, when two vehicles are present in a line in a single traffic lane, that is, between the roadway outer line RL and the center line CL as the preceding vehicles, tracking driving assistance in which the preceding vehicle M1 is tracked may be performed.

Other Embodiments (1) As an aspect of driving assistance, smoothing of the driving assistance process when lane change of the own vehicle is continuously performed, or when the own vehicle makes a left or right turn following lane change may be achieved.

Figure 8:
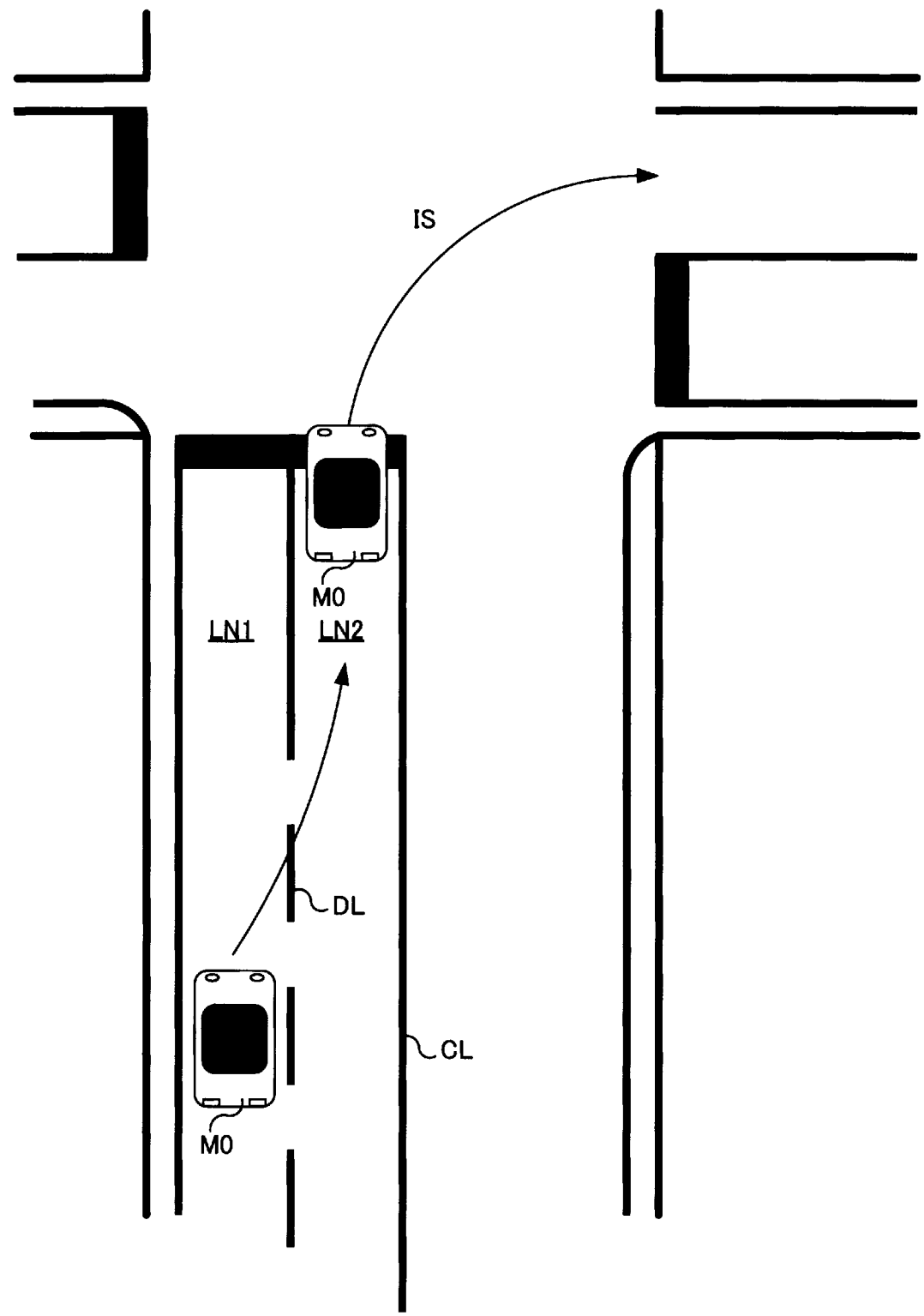
FIG. 8 is an explanatory diagram of movement of an own vehicle from lane change to a right turn according to another embodiment.

For example, in an example shown in FIG. 8, an example of the own vehicle M0 that, to make a right turn, crosses a lane boundary line DL to change lanes from a first traffic lane LN1 to a second traffic lane LN2 and makes a right turn at the intersection IS is given. When the driver of the own vehicle M0 that is traveling in the first traffic lane LN1 performs a turn signal operation to change lanes from the first traffic lane LN1 to the second traffic lane LN2, lane change assistance is performed.

Lane change assistance is a driving assistance process in which the own vehicle M0 is steered from the first traffic lane LN1 to the second traffic lane LN2 by steering assistance, with the turn signal operation as a trigger. In addition, lane change assistance is a driving assistance process in which, when a following vehicle is present behind the own vehicle M0 in the second traffic lane LN2, for example, the driver is alerted by a notification sound or a notification display and, when the likelihood of contact or collision with the following vehicle is high, steering assistance is performed so that the own vehicle M0 does not change lanes to the second traffic lane LN2, that is, the own vehicle M0 remains in the first traffic lane LN1.

A right-turn (i.e., a lane-crossing turn, which is a left turn in the US but a right turn in Japan) assistance process is performed as the driving assistance process when the own vehicle M0 approaches the intersection IS, in addition to the turn signal operation. The right-turn assistance process is a driving process that includes braking assistance and steering assistance that are performed to implement avoidance or suppression of a collision with an opposing vehicle that is advancing straight ahead in an opposing manner in the opposing lane, or avoidance or suppression of a collision with a pedestrian or a bicycle after a right turn is completed.

Conventionally, lane change assistance is performed by the turn signal operation that accompanies lane change. Driving assistance is canceled when lane change is completed. The right-turn assistance process is performed by the turn signal operation for a right turn. Therefore, at least two turn signal operations are required to be performed. Even in cases in which the driver performs lane change with the intention of making a right turn, the right-turn assistance process is not performed when the turn signal operation before the right turn is not performed. The driver may determine that the turn signal operation that is performed at the time of lane change is effectively continued up to the time of the right turn.

In addition, a function in which, as the turn signal operation at the time of lane change, the turn signal flashes three or four times as a result of a light turn signal operation is being increasingly provided. In this case, the driver may determine that the turn signal operation should be continued until the time of the right turn. In these cases, a problem occurs in that the right-turn assistance process is not performed. In addition, two turn signal operations being required during a sequence from lane change to the right turn for the driving assistance process to be performed may be bothersome to the driver.

Therefore, according to the present embodiment, when the driving assistance control apparatus 100 determines that lane change is due to a right turn using the traveling environment detected by the traveling environment detection apparatus 20A, lane change assistance and the right-turn assistance process are both performed with a single turn signal operation at the time of lane change as the trigger. The driving assistance process performed by the driving assistance control apparatus 100 according to the present embodiment will be described with reference to FIG. 8 and FIG. 9. For example, a processing routine shown in FIG. 9 is repeatedly performed at a predetermined time interval from start to stop of a control system of the vehicle or from when a start switch is turned on until the start switch is turned off.

The CPU 101 acquires the traveling environment from the traveling environment detection apparatus 20A and the traveling state from the traveling state detection apparatus 20B through the input/output interface 103 that serves as the acquiring unit (step S300). The CPU 101 determines whether the turn signal operation is performed using the acquired traveling state or, specifically, an operation signal from a turn signal switch (step S310). When it is determined that the turn signal operation is not performed (No at step S310), the CPU 101 ends the present processing routine.

When it is determined that the turn signal operation is being performed (Yes at step S310), the CPU 101 performs a lane change assistance process (step S320). The CPU 101 determines whether the current position of the own vehicle M0 is near the intersection IS (step S330). As the lane change assistance process, the above-described driving assistance process is performed. The determination as to whether the own vehicle M0 is near the intersection IS is performed by the method described according to the second embodiment. When it is determined that the current position of the own vehicle M0 is not near the intersection IS (No at step S330), the CPU 101 ends the present processing routine.

When it is determined that the current position of the own vehicle M0 is near the intersection IS (Yes at step S330), the CPU 101 determines, through prediction, whether the own vehicle M0 will make a right turn, that is, whether the lane change is due to a right-turn (step S340).

For example, the CPU 101 determines that the lane change is due to a right turn when the own vehicle M0 is changing lanes to the right-turn lane LN2 using the position information of the own vehicle M0 and the map information M1, or when a road sign at a destination of the lane change indicates a right-turn lane, or when a road sign indicates the presence of a right-turn lane and the own vehicle M changes lanes to a lane near the center line CL.

In addition, the CPU 101 determines that the lane change is due to right turn using information from a road-vehicle communication apparatus, flashing of a turn signal of a preceding vehicle, and the like. When predicted that the own vehicle M0 will not make a right turn (No at step S340), the CPU 101 ends the present processing routine.

When predicted that the own vehicle M0 will make a right turn (Yes at step S340), the CPU 101 performs the right-turn assistance process (step S350) and ends the present processing routine. As the right-turn assistance process, the above-described driving assistance process is performed. According to the present embodiment, lane change assistance and the right-turn assistance process are seamlessly performed by a single turn signal operation at the time of lane change.

Here, When it is determined that the lane change is due to a right turn using the traveling environment detected by the traveling environment detection apparatus 20A, the CPU 101 may maintain flashing of the turn signal that is triggered by the turn signal operation at the time of lane change, until completion of the right turn. In this case, the own vehicle M0 making a right turn following lane change can be indicated to surrounding vehicles.

(2) The right turn according to the above-described embodiments refers to steering in which the opposing lane is crossed, in the case of left-hand traffic. In case of right-hand traffic, the right turn refers to a left turn.

(3) According to the above-described first to third embodiments, when the preceding vehicle M1 is a parked vehicle, the driving assistance control apparatus 100 does not perform tracking driving assistance. A reason for this is that, in this case, smooth traveling of the own vehicle M0 is obstructed as a result of the own vehicle M0 advancing behind the parked vehicle.

Here, for example, whether the preceding vehicle M1 is a parked vehicle or a stopped vehicle can be determined based on brake lamps or the turn signal. That is, when the brake lamps are illuminated or when the turn signal is hazard-blinking, the preceding vehicle can be determined to be a stopped vehicle. Alternatively, traveling history of the preceding vehicle M1 can be recorded and the preceding vehicle can be determined to be a parked vehicle when a stopped time is longer than a determination time. For example, the determination time is an illumination cycle of a traffic light or an illumination cycle+α.

(4) According to the above-described first to third embodiments, when a plurality of preceding vehicles M1 and M2 is present side by side, the preceding vehicle closest to the road edge RE is possible. Alternatively, when the own vehicle M0 is making a right turn, the preceding vehicle closest to the center line CL is possible.

According to the above-described embodiments, the CPU 101 implements platooning control by software by running the driving assistance program P1. However, platooning control may be implemented by hardware by an integrated circuit or a discrete circuit that is programmed in advance.

The present disclosure is described above based on the embodiments and variation examples. However, the above-described embodiments are provided to facilitate understanding of the present disclosure and do not limit the present disclosure. The present disclosure can be modified and improved without departing from the spirit and scope of claims of the disclosure.

In addition, the present disclosure includes equivalents thereof. For example, embodiments that correspond to technical features in each aspect described in the summary of the invention and technical features in the variation examples can be replaced and combined as appropriate to solve some or all of the above-described issued or to achieve some or all of the above-described effects. Furthermore, the technical features may be omitted as appropriate unless described as a requisite in the present specification.

What is claimed is:

1. A driving assistance control apparatus for an own vehicle, comprising:
   a processor;
   a non-transitory computer-readable storage medium; and
   a set of computer-executable instructions stored on the non-transitory computer-readable storage medium that cause the processor to:
   control a driving assisting unit configured to perform driving assistance including at least lane deviation prevention assistance;
   acquire a traveling environment of the own vehicle;
   determine, based on the traveling environment, whether a current position of the own vehicle is near an intersection;
   determine, based on the traveling environment, whether a preceding vehicle is present near a road edge;
   determine, based on the traveling environment, whether an obstacle is present near the own vehicle on a side of the road edge; and
   while the lane deviation prevention assistance is being performed by the driving assisting unit, in response to determining that the current position of the own vehicle is near the intersection and that the preceding vehicle is present near the road edge and no obstacle is present near the own vehicle on the side of the road edge, cancel the lane deviation prevention assistance and command the driving assisting unit to perform driving assistance in which the preceding vehicle is tracked.

2. The driving assistance control apparatus according to claim 1, wherein:
   the set of computer-executable instructions further cause the processor to command the driving assisting unit to perform driving assistance in which the preceding vehicle is tracked, in response to the preceding vehicle straddling a roadway outer line and no obstacle being present near the own vehicle on the side of the road edge.

3. The driving assistance control apparatus according to claim 2, wherein:
the set of computer-executable instructions further cause the processor to cancel at least lane deviation prevention assistance of which the roadway outer line is a target, and causes the driving assisting unit to perform driving assistance in which the preceding vehicle is tracked.

4. The driving assistance control apparatus according to claim 1, wherein:
the set of computer-executable instructions further cause the processor to command the driving assisting unit to perform driving assistance in response to a plurality of preceding vehicles being present.

5. The driving assistance control apparatus according to claim 1, wherein:
the set of computer-executable instructions further cause the processor to command the driving assisting unit to perform driving assistance in response to a distance between the preceding vehicle and a lane boundary line or a center line being equal to or less than a distance that is prescribed in advance.

6. The driving assistance control apparatus according to claim 1, wherein:
the set of computer-executable instructions further cause the processor to acquire layout information on the intersection, and determine whether the own vehicle is near the intersection using the layout information of the intersection.

7. The driving assistance control apparatus according to claim 1, wherein:
the set of computer-executable instructions further cause the processor to change a target position at a rear of the preceding vehicle based on a distance between the preceding vehicle and the own vehicle or a shape of a road.

8. A driving assistance system comprising:
the driving assistance control apparatus according to claim 1;
a detecting unit that is provided in the own vehicle and detects the traveling environment; and
the driving assisting unit.

9. The driving assistance control apparatus according to claim 1, wherein:
the set of computer-executable instructions further cause the processor to:
determine, based on the traveling environment, whether the own vehicle is positioned near the intersection; and
in response to determining that the own vehicle is positioned near the intersection, command the driving assisting unit to perform driving assistance in which the own vehicle travels or stops near the road edge or a center line.

10. The driving assistance control apparatus according to claim 1, wherein:
the set of computer-executable instructions further cause the processor to:
determine, based on the traveling environment, whether the preceding vehicle is straddling a roadway outer line and the preceding vehicle is identified as a target for tracking; and
in response to determining that the preceding vehicle is straddling the roadway outer line and the preceding vehicle is identified as the target for tracking, suppress at least lane deviation prevention assistance in which the roadway outer line is a control target and command the driving assisting unit to perform driving assistance in which the preceding vehicle is tracked.

11. The driving assistance control apparatus according to claim 10, wherein:
the set of computer-executable instructions further cause the processor to command the driving assisting unit to perform driving assistance in which the preceding vehicle is tracked by the own vehicle straddling the roadway outer line so as to follow the preceding vehicle.

12. A driving assistance control method for an own vehicle comprising:
controlling a driving assisting unit configured to perform driving assistance including at least lane deviation prevention assistance;
acquiring a traveling environment of the own vehicle; and
determining, based on the traveling environment, whether a current position of the own vehicle is near an intersection;
determining, based on the traveling environment, whether a preceding vehicle is present near a road edge; and
determining, based on the traveling environment, whether an obstacle is present near the own vehicle on a side of the road edge; and
while the lane deviation prevention assistance is being performed by the driving assisting unit, in response to determining that the current position of the own vehicle is near the intersection and that the preceding vehicle is present near a road edge and no obstacle is present near the own vehicle on the side of the road edge, canceling the lane deviation prevention assistance and causing the driving assisting unit to perform driving assistance in which the preceding vehicle is tracked.

* * * * *